United States Patent [19]

Tidwell

[11] 4,185,774
[45] Jan. 29, 1980

[54] SELF-STEERING CROP IRRIGATOR

[76] Inventor: Hubert Tidwell, P.O. Box 57, Wellington, Utah 84542

[21] Appl. No.: 929,550

[22] Filed: Jul. 31, 1978

Related U.S. Application Data

[63] Continuation-in-part of Ser. No. 771,262, Feb. 23, 1977, Pat. No. 4,119,272.

[51] Int. Cl.² .............................................. B05B 3/18
[52] U.S. Cl. .................................. 239/184; 239/199; 239/551; 172/26
[58] Field of Search ............... 239/160, 162, 173, 178, 239/183, 184, 186, 187, 189, 191, 197–199, 551, 562; 137/344, 355.12; 172/1, 26

[56] References Cited

U.S. PATENT DOCUMENTS

| | | | |
|---|---|---|---|
| 1,197,534 | 9/1916 | Norton | 239/178 X |
| 2,974,876 | 3/1961 | Poynor et al. | 239/183 |
| 3,235,009 | 2/1966 | Nelson | 239/184 X |
| 3,507,336 | 4/1970 | Nelson | 239/191 X |
| 3,730,431 | 5/1973 | Williams | 239/162 X |

FOREIGN PATENT DOCUMENTS 2506220 9/1975 Fed. Rep. of Germany ........... 239/189

Primary Examiner—Johnny D. Cherry
Attorney, Agent, or Firm—B. P. Fishburne, Jr.

[57] ABSTRACT

An irrigation boom of sufficient length to span a plurality of crop rows has multiple angularly adjustable dual valved water distributors along its length and is carried on a utility platform which mounts a self-contained power drive means for dual traction wheels of the irrigator and a hose reel which supplies water to the boom from a remote source. A forward guidance and stabilizer wheel follows small furrows produced by a furrow former ahead of such wheel and a trailing steering arm carries a shoe which follows in the small furrows rearwardly of the furrow former and rimmed guidance wheel.

7 Claims, 6 Drawing Figures

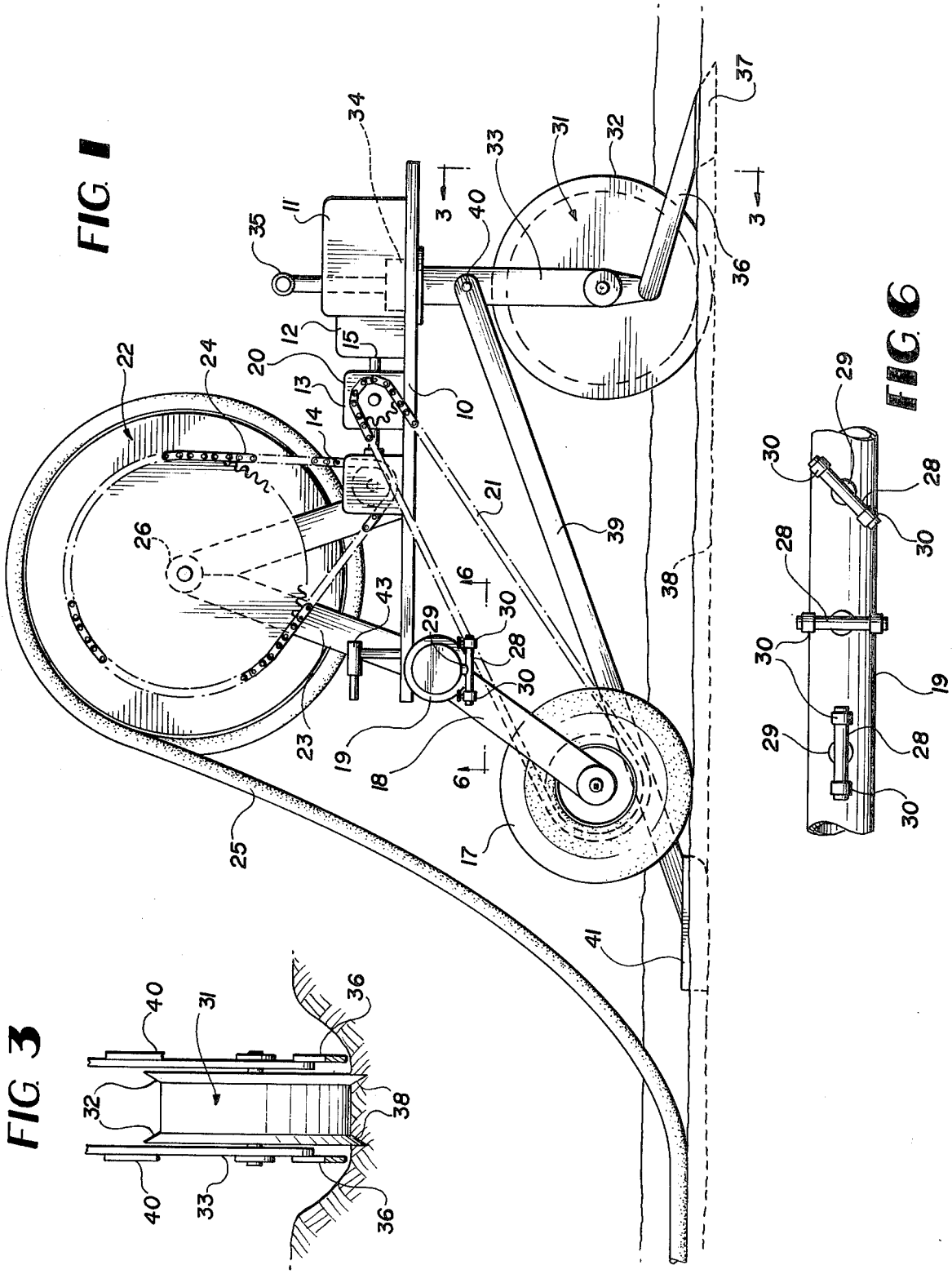

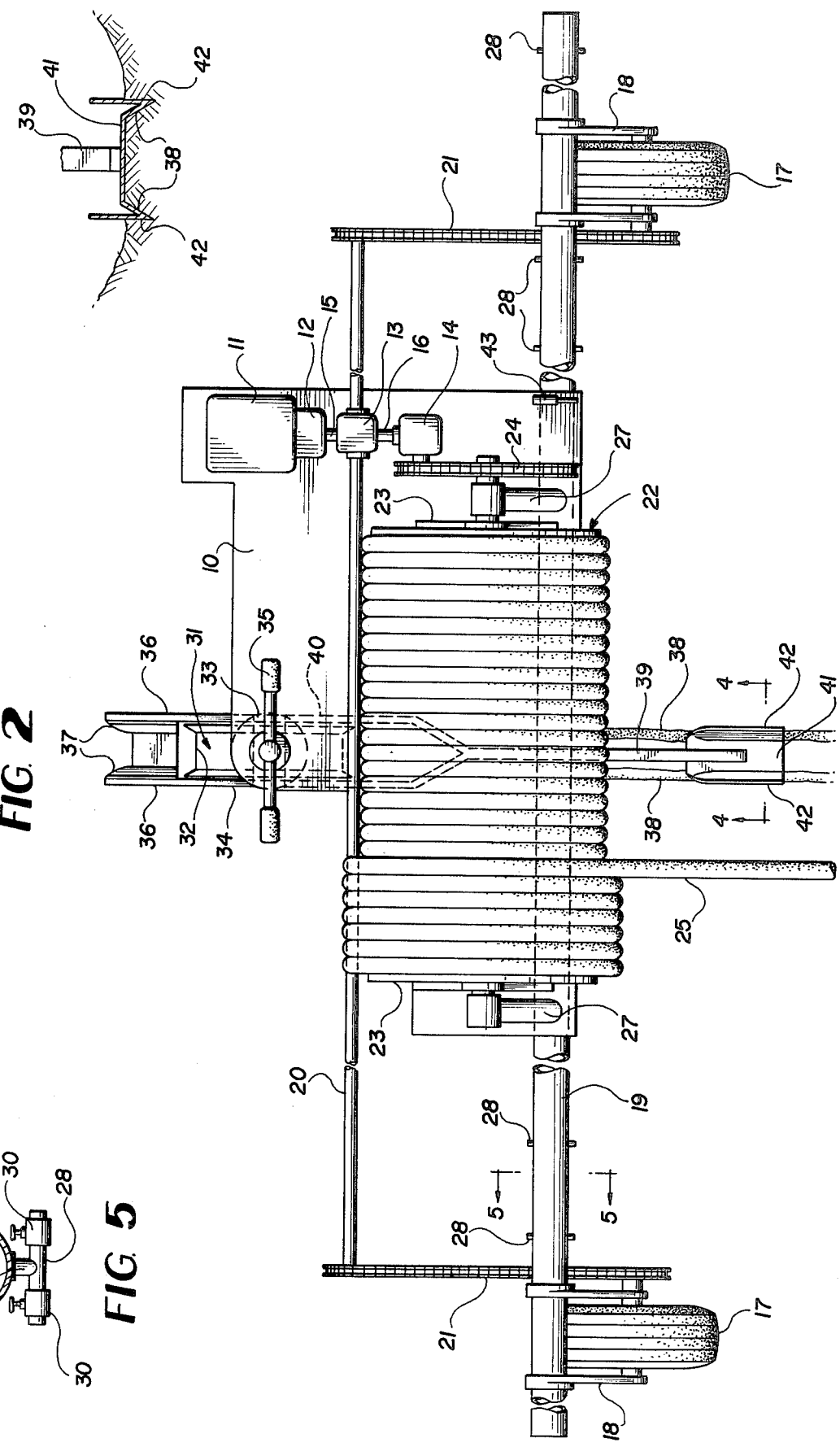

SELF-STEERING CROP IRRIGATOR

CROSS-REFERENCE TO RELATED APPLICATION

This application is a continuation-in-part of prior copending application Ser. No. 771,262, filed Feb. 23, 1977, now U.S. Pat. No. 4,119,272 for MOBILE AGRICULTURAL IRRIGATION APPARATUS.

BACKGROUND OF THE INVENTION

As stated in the above-referenced parent application, the objective of the invention is to provide a less costly and more practical and simplified crop irrigator for use in situations where huge and extremely costly truss irrigators measuring one-quarter mile or more in length are not economically justifiable.

The present invention adds to the capability of the irrigator disclosed in the parent application by the provision forwardly of the two driving or traction wheels of a single guiding and stabilizing wheel which is self-steering and able to follow small furrows produced immediately ahead of it with the aid of a trailing steering arm having a steering shoe which rides in and follows the small furrows. The entire structure is characterized by simplicity and comparative low cost of manufacturing. The irrigator can be built in various sizes and heights to irrigate low or tall standing crops of all kinds.

Other features and advantanges of the invention will become apparent during the course of the following description.

To comply with the duty of disclosing known prior art under 37 C.F.R. 1.56, the following prior patents are made of record herein:
U.S. Pat. No. 1,176,856
U.S. Pat. No. 1,784,251
U.S. Pat. No. 2,122,596
U.S. Pat. No. 2,570,573
U.S. Pat. No. 2,974,876
German Pat. No. 332,308 (1921)

BRIEF DESCRIPTION OF THE DRAWINGS

FIG. 1 is a partly schematic side elevation of a self-steering crop irrigator embodying the present invention.

FIG. 2 is a plan view of the irrigator.

FIG. 3 is an enlarged transverse vertical cross section taken on line 3—3 of FIG. 1.

FIG. 4 is a similar view taken on line 4—4 of FIG. 2.

FIG. 5 is an enlarged vertical section taken on line 5—5 of FIG. 2.

FIG. 6 is an enlarged fragmentary bottom plan view of the irrigation boom taken on line 6—6 of FIG. 1.

DETAILED DESCRIPTION

Referring to the drawings in detail, the numeral 10 designates a horizontal utility platform mounting a suitable engine 11 having a variable speed transmission 12 and first and second gear boxes 13 and 14 driven from the transmission 12 through shafting 15 and 16. The elevated utility platform 10 is supported near its rear edge by rear widely spaced drive or traction wheels 17 which are non-steerable and parallel. The wheels 17 are connected through inclined struts 18 with an elevated transverse horizontal irrigation boom 19 of suitable length generally as described in the referenced parent application. The mid-portion of the boom 19 is further suitably anchored to the utility platform 10 so that the boom is rigid with the platform and the traction wheels 17 and has its axis parallel to the common axis of the wheels 17. The two traction wheels 17 are powered from the first gear box 13 through a first transverse line shaft 20 and chain gearing 21 drivingly coupled to opposite ends of the shaft 20 and to the two traction wheels.

A hose reel 22 of the type shown and described in detail in the referenced parent application is rotatably supported above the platform 10 on end frames 23. The hose reel 22 is driven by chain gearing 24 from the second gear box 14 for the purpose of paying out or reeling in a hose 25 coiled thereon and leading to a stationary source of irrigation water exactly as described in the parent application. Water delivered through the hose 25, while the irrigator is traversing a field, passes through a swivel coupling 26 on the center shaft of the hose reel and through such shaft into descending distributor tubes 27 which are suitably coupled into the tubular irrigation boom 19, exactly as described in said application, and the details of which need not be repeated herein.

Irrigating water from the boom 19 is delivered with precision and without wasting onto row crops through a plurality of longitudinally equidistantly spaced distributor tubes 28 on the underside of the boom 19, FIG. 6. As shown in this figure, the distributor tubes 28 are independently angularly adjustable about the vertical axis fittings 29 at their centers and the tubes are valved at 30 near opposite ends for the sake of maximum control and economizing on the use of water as found necessary for particular crops. By adjusting the valves 30 and the angular positions of the tubes 28, streams of irrigating water can be directed with accuracy onto the crops. This accuracy of irrigating benefits the crops and prevents water wasting by misdirection and by evaporation as occurs in spray or sprinkler types of irrigation machines.

The forward end of the utility platform 10 is supported, stabilized and guided by a single front wheel 31 forming a salient feature of the invention. The wheel 31 is a metal wheel disposed midway between the traction wheels 17 and in advance thereof. It is channeled, as shown in FIG. 2, to form opposite side furrow following rims 32 thereon. The wheel 31 is carried by a vertical steering fork 33 journaled to the platform 10 through a bearing 34. The fork may be equipped at its top and above the platform 10 with a steering handle bar 35. The bottom of the steering fork 33 carries forwardly projecting arms 36 close to opposite sides of the wheel 31, and immediately ahead of the wheel 31 the arms 36 carry small furrow formers 37 which constantly produce two small grooves or furrows 38 for the guidance of wheel rims 32 as the irrigator traverses a field of crops in one linear direction.

A trailing steering arm 39 is attached at 40 to the fork 33 above the wheel 31, FIG. 1, and the rearward end of this steering arm carries a sled-like steering shoe 41 rigid therewith. The shoe 41 has side parallel V-flanges 42, FIG. 4, which engage in and follow the small furrows 38 faithfully to maintain the irrigator on a chosen linear path.

The irrigator is preferably provided on the platform 10 with a small optical scope 43 by means of which the machine can be initially aligned with a distant marker to establish a proper path toward the far side of the field.

The general mode of use of the irrigator is as described in the parent application. The principal improvements reside in the provision of the front self-steering or guidance wheel 31 and associated elements 37, 39 and 41, and the improved construction of the boom 19 with its individually adjustable and valved distributor tubes 28. The advantages of the present invention over the prior art should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A crop irrigator comprising a support, power drive means on the support, a pair of widely spaced support and traction wheels for the support secured thereto and operatively connected with the power drive means, a hose reel on the support and operatively connected with the power drive means, an irrigation boom on the support having a connection with the hose of the hose reel and extending transversely thereof and substantially parallel to the axis of said traction wheels and having multiple irrigation water outlet means along its length for irrigating crops in rows, a front self-steering and stabilizing wheel for the support forwardly of and substantially midway between said traction wheels and being channeled to form thereon a pair of opposite side furrow following rims, a furrow former in advance of said front wheel and secured thereto and adapted to form two parallel guidance furrows for said furrow following rims, an elongated trailing steering arm connected with said front wheel and extending for a substantial distance rearwardly thereof, and a shoe element on the rear of said steering arm having guidance flanges adapted to ride in said parallel furrows.

2. A crop irrigator as defined in claim 1, wherein said front wheel is a substantially rigid metal wheel and said rims have a V-cross section.

3. A crop irrigator as defined in claim 1, and said steering arm being inclined downwardly rearwardly and said shoe element being a sled-like element rigid with the steering arm, said guidance flanges being of V-cross section and being parallel and spaced apart equidistantly with said furrow following rims.

4. A crop irrigator as defined in claim 1, and each irrigation water outlet means on said irrigation boom comprising a tube swiveled to the bottom of the boom and being rotational and adjustable in a substantially horizontal plane independently of adjacent tubes.

5. A crop irrigator as defined in claim 4, and a pair of independent flow control valves on each tube near opposite ends thereof, whereby irrigation water can be delivered controllably from one or both ends of each tube with the tube angularly adjusted to direct water with precision onto row crops.

6. A crop irrigator as defined in claim 1, and said front wheel including a fork journaled in a bearing means of the support and being equipped above the support with a turning handle, the leading end of said steering arm being coupled with said fork.

7. A crop irrigator as defined in claim 6, and said traction wheels comprising wheels having pneumatic tires.

* * * * *